US006213438B1

United States Patent
Ostby et al.

(10) Patent No.: US 6,213,438 B1
(45) Date of Patent: Apr. 10, 2001

(54) COMPUTER SUPPORT FOR VEHICLE USE HAVING MULTIPLE POSITION ADJUSTMENTS

(76) Inventors: LeRoy M. Ostby, 1221 E. Warner Ave., Santa Ana, CA (US) 92705; Scot McCallon, P.O. Box 609, Big Bear City, CA (US) 92314

( * ) Notice: Subject to any disclaimer, the term of this patent is extended or adjusted under 35 U.S.C. 154(b) by 0 days.

(21) Appl. No.: 09/465,407

(22) Filed: Dec. 16, 1999

(51) Int. Cl.[7] .................................................. F16M 11/06
(52) U.S. Cl. .................. 248/276.1; 224/539; 224/553; 224/564; 224/929; 248/122.1; 248/176.3; 248/920; 248/279.1
(58) Field of Search .............................. 248/124.1, 125.9, 248/918, 919, 920, 921, 922, 923, 924, 419, 420, 421, 122.1, 123.11, 274.1, 276.1, 278.1, 279.1, 280.11, 281.11, 283.1, 176.3, 178.1, 917; 224/545, 553, 564, 539, 929; 108/44

(56) References Cited

U.S. PATENT DOCUMENTS

| 4,946,120 | * | 8/1990 | Hatcher | 248/183.1 |
| 5,279,488 | * | 1/1994 | Fleming | 248/279.1 |
| 5,289,957 | * | 3/1994 | Huang | 224/42.24 |
| 5,553,820 | * | 9/1996 | Karten et al. | 248/286.1 |
| 5,615,854 | * | 4/1997 | Nomura et al. | 248/287.1 |
| 5,751,548 | * | 5/1998 | Hall et al. | 361/686 |
| 5,769,369 | * | 6/1998 | Meinel | 248/176.1 |
| 5,876,008 | * | 3/1999 | Sweere et al. | 248/325 |
| 5,975,472 | * | 11/1999 | Hung | 248/278.1 |
| 6,012,693 | * | 1/2000 | Voeller et al. | 248/280.11 |

* cited by examiner

Primary Examiner—Ramon O. Ramirez
Assistant Examiner—Jon Szumny
(74) Attorney, Agent, or Firm—Roy A. Ekstrand

(57) ABSTRACT

A computer support for use in a vehicle interior includes a base having a pivotally secured riser bracket coupled thereto. The base is attached to a convenient vehicle surface such as the transmission hump or the like. A pair of telescoping risers are supported by the riser bracket and provide vertical movement of an arm carrier mechanism. The arm carrier in turn supports a pair of pivotally coupled arms which in turn support a platform bracket. A computer platform suitable for receiving and supporting a portable computer is received upon the platform bracket and includes a lock mechanism for securing the computer against unauthorized removal. Adjustments are provided for the vertical heights and horizontal position as well as angular tilt and horizontal angular position of the computer platform. Each adjustment of each position and angle includes apparatus for securing and maintaining a selected position.

17 Claims, 4 Drawing Sheets

COMPUTER SUPPORT FOR VEHICLE USE HAVING MULTIPLE POSITION ADJUSTMENTS

FIELD OF THE INVENTION

This invention relates generally to computer support systems and particularly to those utilized within the interior of emergency and service vehicles such as police, fire, and ambulance vehicles. The present invention is further related to any situation in which it is desired to provide an adjustable support for a computer in commercial or recreational type vehicles as well.

BACKGROUND OF THE INVENTION

The advent of small powerful computers such as notebook computers and/or laptop computers and similar devices has provided an effective tool for use in connection with activities such as police service, fire fighting, and ambulance or emergency medical type vehicles. As the use of such small portable computers has continued, the prospect looms for provision of such computers within the interior of conventional vehicles and commercial/industrial vehicles. In the environment of police vehicles in particular the access via the radio transmission system of the vehicle facilitates rapid access to information required by police officers. Critical information needs such as tracing license numbers, obtaining an indication of persons wanted for arrest warrants and so on as well as other forms of information is available via data links. Notsurprisingly, police and other emergency vehicle users have for the most part acceded to ever increasing use of and dependence upon vehicle installed computers. In a typical computer installation the raised hump often referred to as the transmission hump within the vehicle receives a conforming bracket overlying the transmission hump and secured to several structural strong points such as seat bolts. A support base to which a riser is secured is attached to the bracket. The riser in turn supports a generally horizontal computer platform for receiving the computer and supporting it between the front seats of the vehicle.

Such computer supports are required to meet several environmental limitations within the vehicle. For example, in vehicles such as police cars which are converted standard vehicles, the interior is already substantially crowded due to the installation of a gun rack, a video camera, and an Emergency Equipment Console as well as other miscellaneous equipment. Further, the typical use to which such vehicles are subjected requires positional capability which accommodates persons in either of the vehicle front seats. Finally, some mechanism must be provided for securely locking the computer within the vehicle.

To meet the need for effective support of computers within such vehicles, practitioners in the art have provided a variety of devices for receiving and securing the computers. Thus, practitioners employ a metal base which is configured for attachment to the vehicle transmission hump together with a vertically oriented and often rearwardly angled riser which supports the computer platform. Most laptop, notebook or other portable computers provide cooperative portions which facilitate attachment of the computer to the platform. Also provided are numerous connection ports at the rear of the computer for communicating information and power between the computer and the remainder of the vehicle electrical system.

Such devices have, to some extent, met some of the above requirements. However, most either lack the full multi-access adjustment capabilities desired within the crowded vehicle environment or are fabricated utilizing a prohibited degree of complexity and costs.

As a result, there remains a need in the art for ever more efficient, cost effective, simple to use and reliable computer support apparatus for vehicular operation of computer devices.

SUMMARY OF THE INVENTION

Accordingly, it is a general object of the present invention to provide an improved computer support for vehicle use. It is a particular object of the present invention to provide an improved computer support for vehicle use which extends the position adjustment of the supported computer to better accommodate the limited space within the vehicle interior.

In accordance with the present invention, there is provided a computer support for use in supporting a computer within a vehicle, the computer support comprising: a base securable to a surface within a vehicle; a riser bracket pivotally secured to the base at a first pivotal attachment; a pair of extendible risers each secured to the riser bracket and each having an extendible slide for vertical position adjustment; an arm carrier secured to the slides; a pair of elongated arms pivotally joined together at a common pivot to form a second pivotal attachment, one of the elongated arms being pivotally secured to the arm carrier at a third pivotal attachment; a platform bracket carrier pivotally secured to the remaining one of the elongated arms at a fourth pivotal attachment; a platform bracket pivotally secured to the platform bracket carrier at a fifth pivotal attachment; a computer platform secured to the platform bracket and having means for engaging a computer; and lock means for releasibly captivating a computer upon the computer platform.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
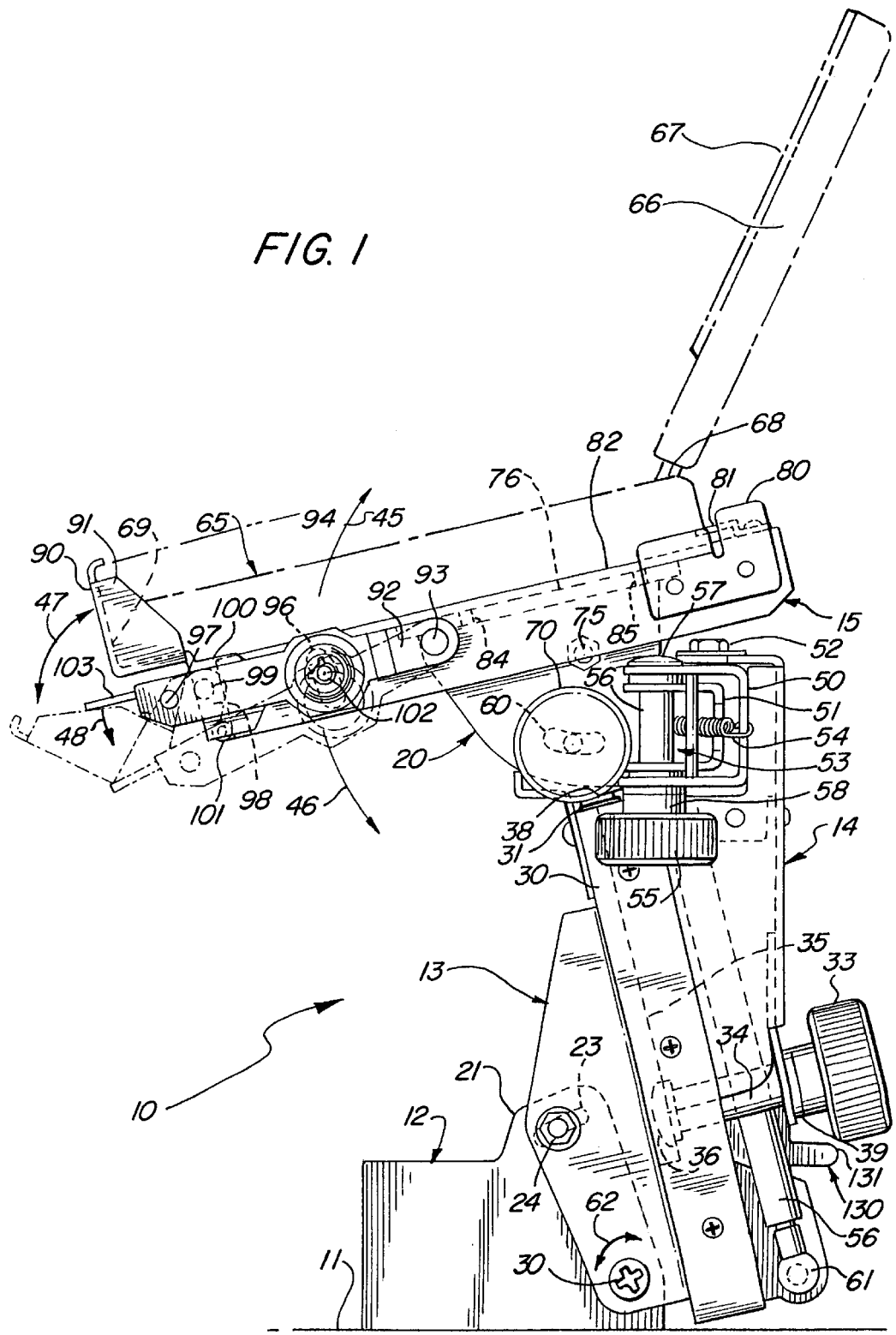
FIG. 1 sets forth a side elevation view of a computer support constructed in accordance with the present invention supporting a typical computer in dashed-line representation.

FIG. 1 sets forth a side elevation view of a computer support constructed in accordance with the present invention and generally referenced by numeral 10. By way of overview, computer support 10 is fabricated by assembling several subassemblies which includes a base 12, a riser 30, an arm carrier 14, a pair of pivotally coupled arms 50 and 51, a platform bracket 20 and a computer platform 15. Base 12 provides attachment to a vehicle surface 11 such as the transmission hump of a vehicle and in turn supports a riser bracket 13 which supports riser 30. Arm carrier 14 is secured to and vertically moveable with riser 30 to elevate computer platform 15 as desired. Pivotally coupled arms 50 and 51 support platform 15 through platform bracket 20. As a result and as is described below in greater detail, computer 65 having a lid 66, screen 67 and hinge 68 is supported upon computer platform 15 and is moveable vertically, front-to-back, axially, and side-to-side with each position being capable of fixed adjustment.

More specifically, computer support 10 includes a base 12 formed of a rigid material such as steel having a plurality of apertures such as apertures 49 (seen in FIG. 4) formed in the bottom surface thereof to facilitate attachment to a vehicle 11. Such attachment may be carried forward using conventional fasteners. Base 12 further defines a pair of generally parallel upwardly extending flanges 21 and 22 (flange 22 shown in FIG. 4). Flange 21 defines a curved slot 23 which receives a bolt 24. While not seen in the figures, it will be understood that flange 22 shown in FIG. 4 defines a corresponding curved spot which also receives bolt 24.

Figure 2:
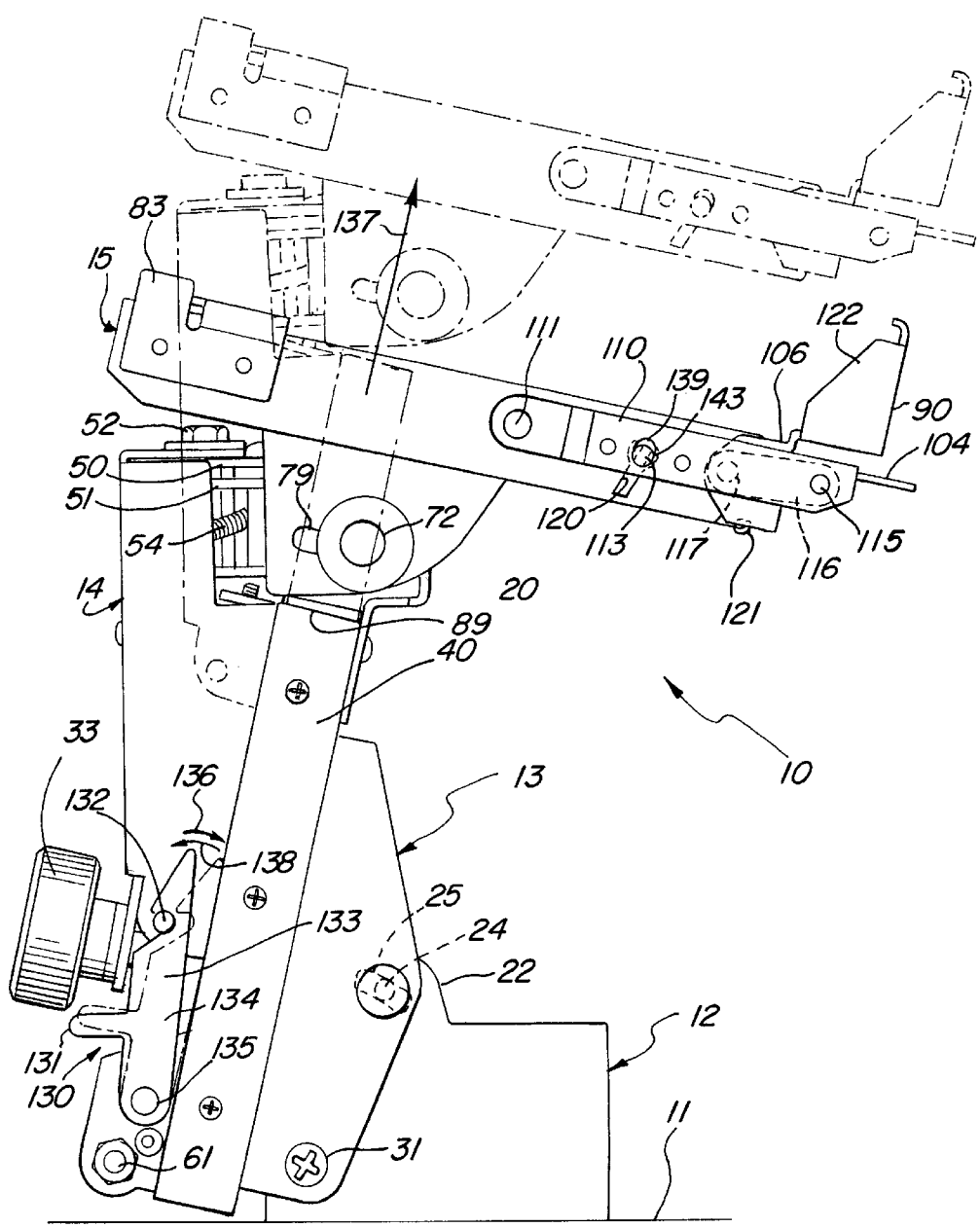
FIG. 2 sets forth a side elevation view of the present invention computer support indicating vertical riser adjustment positions.

A riser bracket 13 is received upon flanges 21 and 22 and is secured thereto by bolt 24 and a pivot 30. While not seen in FIG. 1, it will be understood that riser bracket 13 and flanges 21 and 22 (flange 22 seen in FIG. 4) define respective apertures which facilitate the pivotal attachment using pivot bolt 30 and bolt 24. In accordance with the preferred embodiment of the present invention, riser bracket 13 is pivotable about pivot 30 in the directions indicated by arrows 62 as bolt 24 is loosened to facilitate movement through slot 23 and slot 25 (seen in FIG. 2). The angular adjustment thus provided between base 12 and riser bracket 13 is set to the desired angle after which bolt 24 is tightened to secure and maintain the selected adjustment. A pair of risers 30 and 40 (riser 40 seen in FIG. 4) are secured to riser bracket 13. A pair of slides 31 and 41 (slide 41 seen in FIG. 4) are telescopically moveable within risers 30 and 40 respectively for upward extension from the collapsed position shown in FIG. 1. As is better seen in FIG. 4, slides 31 and 41 support platform bracket 20 for vertical movement as slides 31 and 41 are moved within interior channels 32 and 42 formed in risers 30 and 40 respectively. This vertical movement of platform bracket 20 allows the vertical position of computer platform 15 to be adjusted as shown in FIG. 2.

Returning to FIG. 1, an arm carrier 14 is secured to slides 31 and 41 of risers 30 and 40 (riser 40 and slide 41 seen in FIG. 4) and is thus moveable in combination with platform 20. A bolt shaft 34 includes a head 36 received within a lock guide 35 for sliding attachment. Shaft 34 is threadably engaged with an interior threaded end 39 of a riser adjustment knob 33. The vertical position of arm carrier 14, platform bracket 20 and risers 30 and 40 with respect to riser bracket 13 is secured at a selected height by tightening riser adjustment knob 33 against lock guide 35.

Arm carrier 14 is, as mentioned above, secured to and carried with risers 30 and 40. Arm carrier 14 includes a pivot 52 formed of a bolt having an elongated shaft for threaded attachment to arm carrier 14. Pivot 52 receives one end of an arm 50 in pivotal attachment. As is better seen in FIG. 4, arm 50 is pivotable about pivot 52 and is further coupled to an arm 51 in a second pivotal attachment provided by a bolt 56. Bolt 56 includes a head 57 and a threaded end at the opposite end thereof (not shown). A knob 55 includes a threaded portion 58 which receives the threaded end of bolt 56. A spring 54 is coupled between bolt 56 and arm 50 to provide a restoring force urging the combination of arms 50 and 51 towards the collapsed position shown in FIG. 1. Knob 55 is utilized to secure the angular position selected between arms 50 and 51 to position platform bracket 20 while the bolt of pivot 52 is given a fixed setting.

As is better seen in FIG. 4 and described in greater detail below, platform bracket 20 is pivotally secured to the outer end of arm 51 by a pivot bolt 125 to allow platform bracket 20 to pivot in a horizontal plane. By means also set forth below in FIG. 4 in greater detail, platform bracket 20 is pivotal in a vertical plane to facilitate the positioning of platform bracket 20 at the desired tilt-angle. Platform bracket 20 further supports a generally rectangular and generally planar flange 76 having a plurality threaded apertures 84 and 85 formed therein.

A computer platform 15 forms a generally planar member having a substantially planar upper surface 82. Platform 15 is received upon and secured to flange 76 of platform bracket 20 in the manner shown in FIG. 3 using a plurality of threaded fasteners. Computer platform 15 defines a pair of brackets 80 and 83 (bracket 83 seen in FIG. 3) together with a clamp 81. For purposes of illustration, a conventional computer of the type contemplated in the present invention is shown in dashed-line representation and is generally referenced by numeral 65. In accordance with conventional fabrication techniques, computer 65 includes cooperating portions which facilitate the attachment of computer 65 upon surface 82 using brackets 80 and 83 (bracket 83 seen in FIG. 3).

Figure 3:
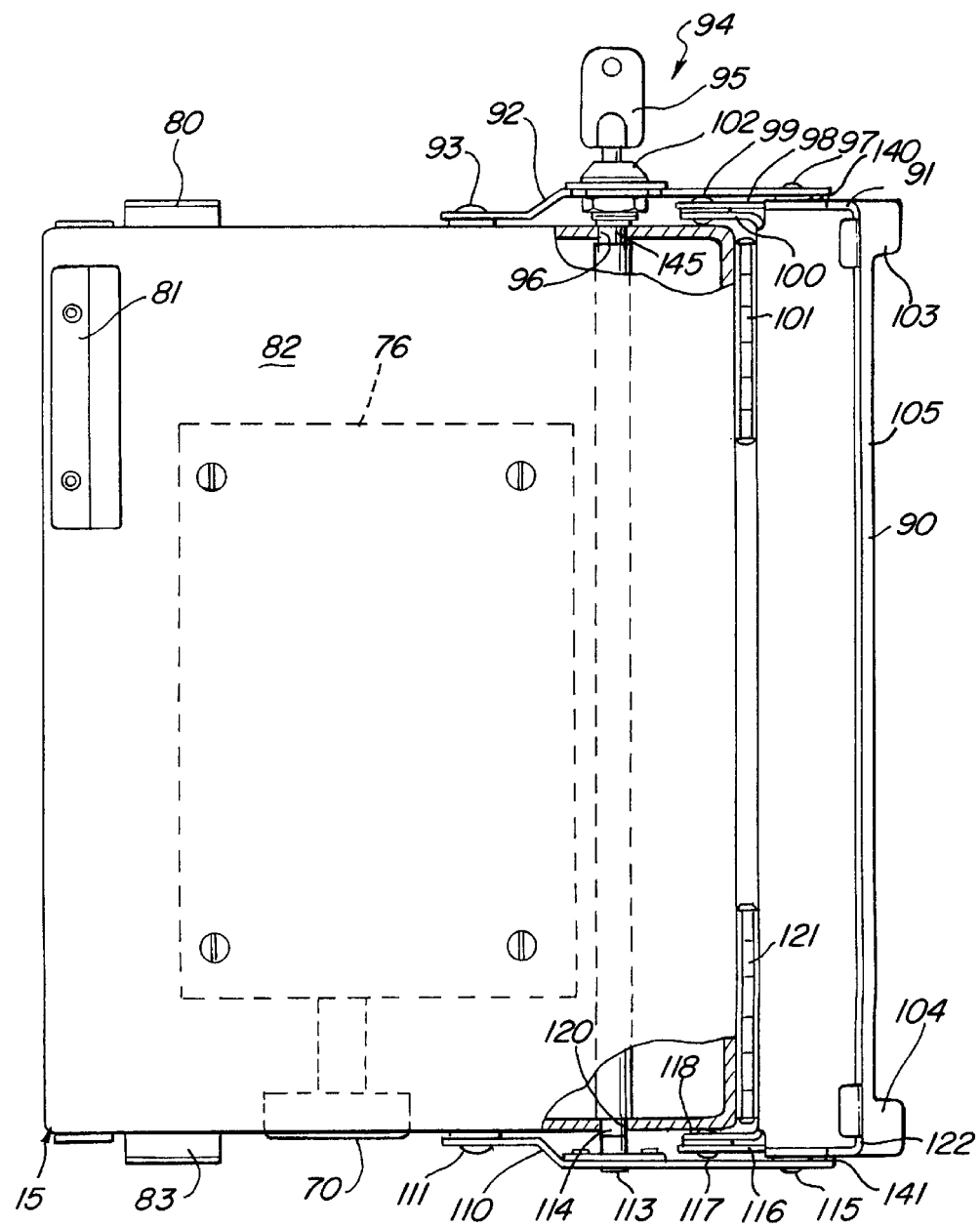
FIG. 3 sets forth a partially sectioned top view of the present invention computer support.

Computer platform 15 further includes a pivotally moveable lock bar 90 having corner flanges 91 and 122 (flange 122 seen in FIG. 3). In the raised position shown in FIG. 1, lock bar 90 operates to complete the secure attachment of computer 65 upon computer platform 15. In essence, lock bar 90 presses against the front corners of computer 65 to maintain secure attachment and position and to prevent removal of computer 65.

Computer platform 15 further supports a key lock operative locking mechanism 94 which allows restriction of computer removal to persons having the prescribed cooperating key. Locking mechanism 94 includes a lock arm 92 having one end pivotally secured to platform 15 by a pivot 93. The remaining end of lock arm 92 is secured to a tab 103 which in turn extends from a tab carrier 105 (seen in FIG. 3). Thus, lock arm 92 is pivotable about pivot 93 in response to force applied to tab 103. As is better seen in FIG. 2, lock mechanism 94 further includes a lock arm 110 pivotally secured to platform 15 by a pivot 111. In further correspondence to lock arm 92, lock arm 110 is secured to a tab 104 which, as is seen in FIG. 3, is also joined to tab carrier 105. Thus, the combined structures of lock arms 92 and 110 together with tabs 103 and 104 and tab carrier 105 is pivoted with respect to platform 15 by pivots 93 and 111 respectively.

Lock bar 90 defines corner flanges 91 and 122 (seen in FIG. 2) which receive the front corners of computer 65 in the locked position shown in solid-line representation in FIG. 1. Lock bar 90 further includes a pair of flanges 100 and 118 (seen in FIG. 3) which pivotally couple lock bar 90 to hinges 101 and 121 (seen in FIG. 3). As a result, lock bar 90 is pivotable about hinges 101 and 121 between the locked position shown in solid-line representation and the open position shown in dashed-line representation and as indicated by arrows 47.

Lock arm 92 includes a pivot 97 coupled to one end of a connecting link 98 (seen in FIG. 3), the remaining end of which is pivotally coupled to flange 100 by a pivot 99. Once again with temporary reference to FIG. 2, it will be noted that lock arm 110 includes a pivot 115 coupled to one end of a connecting link 116, the remaining end of which is pivotally coupled to flange 106 by a pivot 117.

In the operation of lock mechanism 94, it will be assumed initially that key lock 102 has been moved to the open position allowing removal of computer 65. Accordingly, tabs 103 and 104 (seen in FIG. 3) are pressed downwardly as indicated by arrow 48. The downward movement of tabs 103 and 104 pivots lock arms 92 and 110 (seen in FIG. 3) about their respective pivots to the dashed-line position shown in FIG. 1. As lock arms 92 and 110 pivot downwardly in the direction indicated by arrow 46, the coupling between the lock arms and flanges 100 and 118 (seen in FIG. 3) causes lock bar 90 to pivot about hinges 101 and 121. Thus, lock bar 90 is simultaneously lowered and pivoted toward the dashed-line position shown in FIG. 1. Thereafter, lock bar 90 no longer captivates computer 65 and the computer may be removed from platform 15.

Computer 65 is captivated upon platform 15 by an operation essentially the reverse of that described above. Thus, the upward movement of tabs 103 and 104 (seen in FIG. 3) pivots lock arms 92 and 110 (seen in FIG. 3) upwardly in the direction indicated by arrow 45. As the lock arms pivot upwardly, connecting links 98 and 116 pivot lock bar 90 about hinges 101 and 121 (seen in FIG. 3) to again raise lock bar 90 to the locking position. In the preferred fabrication of the present invention, the placement of pivot 97 and pivot 99 relative to the length of link 98 is selected to provide a slight "over-center" final position when tab 103 is fully raised. This over-center action enhances the maintenance of position for lock bar 90. In a similar function, the position of pivots 115 and 117 and the length of link 116 (all seen in FIG. 2) is similarly structured to provide and over-center action.

Lock mechanism 94 is operated by key lock 102 to maintain a locked position or facilitate opening of lock bar 90 in response to the rotational position of a key (not shown) received within key lock 102. The structure of key lock 102 in facilitating this locked and unlocked characteristic is described below in FIG. 3 in greater detail. Suffice it to note here that lock arm 92 is coupled to lock arm 110 (seen in FIG. 3) by an elongated shaft which is movable in one rotational position and is captivated in an alternate rotational position. Thus, the rotational position of a key within key lock 102 determines whether lock arms 92 and 110 are secured or may be pivoted downwardly.

As described above, the combined assembly of slides 31 and 41 (seen in FIG. 4) together with arm carrier 14 and arms 50 and 51 is movable vertically to a desired vertical extension. To facilitate a smoother action of the vertical extension thus provided, a gas shock element 59 includes a socket end 61 secured to base 12 at its lower end and a corresponding socket end (not shown) secured to arm carrier 14. As a result, gas shock 59 provides a smoothing action for the vertical adjustment of arm carrier 14.

Thus, computer support 10 provides a plurality of position and motion adjustments for computer 65 upon computer platform 15. Certain adjustments set forth herein are preferably intended to be preset to the desired position and thereafter secured with a bolt using an appropriate wrench to be maintained on a somewhat long term basis. In contrast, other adjustments provided for computer support 10 are operated in response to readily accessible and easily handled knobs in anticipation of such adjustments being changed frequently to suit user preference. In essence, the more or less long term adjustments are likely to correspond to those position adjustments which are necessitated in order to fit computer support 10 into the environment while the more frequently adjusted position apparatus is anticipated to be used in configuring computer support 10 to individual preferences of different users within the host vehicle.

Thus for example, the angle between risers 30 and 40 (seen in FIG. 2) which determines the vertical axes of movement of computer platform 15 is set in a generally long term setting by tightening bolt 24 against riser bracket 13 and base 12. With this angle determined, computer platform 15 may be raised along the main axes of risers 30 and 40 (seen in FIG. 2) by loosening riser adjustment knob 33 raising the platform to the desired position and tightening riser adjustment knob 33. Once the general height has been adjusted, the interior end of arm 50 is adjusted with respect to arm carrier 14 by tightening the bolt provided at pivot 52. This sets the range of motion for arms 51 and 52 and the corresponding range of horizontal positions available for computer platform 15. The horizontal position of computer platform 15 may then be adjusted by loosening knob 55 and moving platform 15 to the desired horizontal position. Thereafter, knob 55 is tightened securing the angle between arms 50 and 51 and setting the horizontal position of computer platform 15. Once the horizontal position of platform 15 has been set, a further horizontal adjustment of platform 15 may be made by pivoting platform bracket 20 about bolt 125 (seen in FIG. 4). Finally, the tilt or angle of platform 15 is adjusted by loosening platform tilt adjustment knob 70 and tilting computer platform 15 to the desired angle. Tightening of knob 70 then secures this position.

As a result of the foregoing described multiple adjustment capability of the present invention computer support, computer 65 may for all practical purposes be positioned of a wide range of positions both vertically, horizontally and angularly to a degree that variation of the size and preferences of users as well as exchange between the operator's position in the driver seat verses the operator's position being in the passenger seat. In further accordance with the present invention, the support of computer 65 upon computer 15 is solid and secure through all ranges of motion and adjustment.

FIG. 2 sets forth a side elevation view of computer support 10 in its contracted or compacted position. FIG. 2 also shows computer support 10 in its raised or extended position as depicted in dashed-line representation. As described above, computer support 10 includes a base 11 having a pair of flanges 21 and 22 (flange 21 seen in FIG. 1). Base 12 is secured to a vehicle surface 11 using a plurality of conventional fasteners (not shown) which are passed through apertures 49 of base 12 (seen in FIG. 4). Computer support 10 further includes a riser bracket 13 having a pivot 31 securing riser bracket 13 to base 12 in a pivotal attachment. In addition, riser bracket 13 supports a pair of riser 30 and 40 (riser 30 seen in FIG. 4). Flanges 21 and 22 define respective curved slots 25 and 23 (seen in FIG. 1) through which a conventional headed bolt 24 is passed and secured by a conventional fastening nut. Computer support 10 further includes an arm carrier 14 secured to risers 30 and 40 by a pair of slides 31 and 41 respectively (seen in FIG. 4). Arm carrier 14 further supports and arm 50 in a pivot attachment using a bolt 52 together with an arm 51 pivotally coupled to the end of arm 50. A return spring 54 is operative to urge arms 50 and 51 to the collapsed position shown in FIG. 2.

Figures 4, 5:
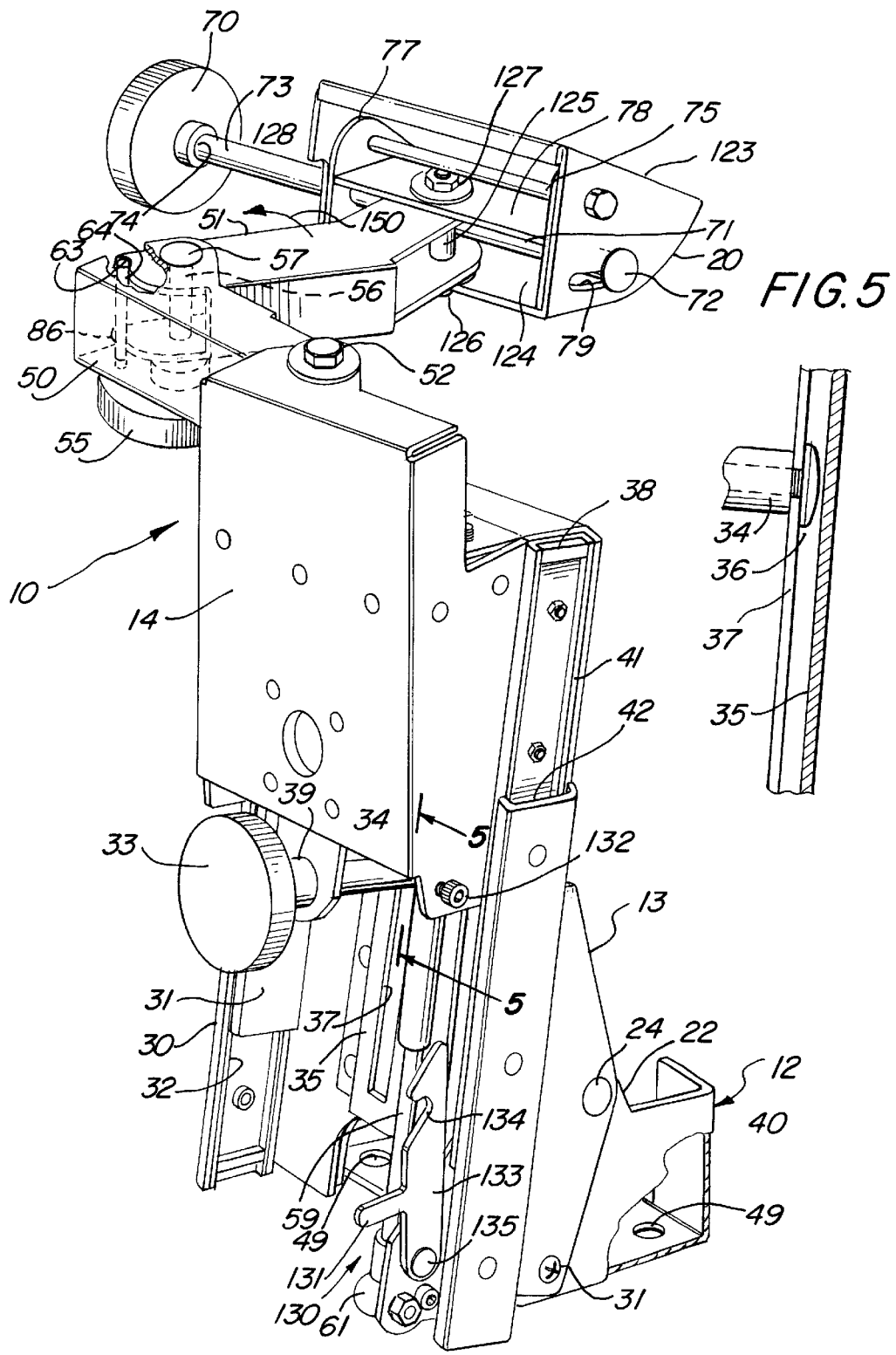
FIG. 4 sets forth a partially sectioned perspective view of the present invention computer support having the computer platform removed therefrom.
FIG. 5 sets forth a partial section view of the computer support of FIG. 4 taken along section lines 5—5 therein.

A platform bracket 20 is supported upon the outer arm 51 in the manner seen in FIG. 4. Suffice it to note here that the combination of arm carrier 14, arms 50 and 51, and platform bracket 20 are vertically moveable in the direction indicated by arrow 137 toward the extended position shown in dashed-line representation to raise platform bracket 20. A stop 89 is secured to the upper portion of slide 41 to limit the downward travel of platform bracket 20. Arm carrier 14 further includes a lock pin 132. Riser bracket 13 further includes a pivot 135 having a latch arm 133 pivotally secured thereto. Latch arm 133 cooperates with pin 132 to provide a latch mechanism 130. Latch arm 133 further includes a tab 131 and a notch 134. While not seen in FIG. 2, it will be understood that latch mechanism 130 further includes a spring urging latch arm 133 in the pivotal direction indicated by arrow 138. With arm carrier 14 at its lowest position as shown in solid line representation in FIG. 2, pin 132 is received within notch 134 securing arm carrier 14 at its lowest position. To raise arm carrier 14 in the direction indicated by arrow 137 for adjustment, the user simply rotates latch arm 133 in the direction indicted by arrow 136 using tab 131. This releases pin 132 and allows arm carrier 14 to be raised extending sides 31 and 41 (seen in FIG. 4) upwardly thereby raising platform bracket 20. As described above, bolt 24 may be loosened to pivot riser bracket 13 about pivot 31 to adjust the vertical angle of this upward movement. As is also described above, a riser adjustment knob 33 includes a threaded end 39 which as is better seen in FIG. 5 is operative to secure the desired vertical extension of risers of 30 and 40 (seen in FIG. 4).

In accordance with an important aspect of the present invention, latch 130 provides a simple "push-down" latch to quickly and easily secure and latch the present invention computer support in the collapsed position of FIG. 1. This allows the vehicle occupants to quickly secure the computer at a position which is for the most part, removed from the space taken up by a vehicle air bag deployment. The effect of having the support and its computer within the path of an exploding air bag could be catastrophic, Thus, this feature alone renders the present invention computer support more safe and secure by ensuring that the computer will either not be impacted by the air bag or merely minimally impacted.

A platform bracket 20 is pivotally secured to arm 51 in the manner shown more clearly in FIG. 4. Suffice it to note here that platform bracket 20 is adjustable to provide the desired tilt-angle using a bolt 71 and a platform adjustment knob 70 (both seen in FIG. 4). Slot 79 receives blot 71 and secures head 72 against one side of platform bracket 20. Platform bracket 20 further supports a computer platform 15 having a planar surface and a plurality of brackets 83 and 80 (bracket 80 seen in FIG. 3) supported thereon for securing a conventional computer such as computer 65 shown in FIG. 1. Computer platform 15 further supports a lock bar 90 having a flange 106 pivotally secured to platform 15 by a hinge 21. A lock arm 110 is pivotally secured to platform 15 by a pivot 111 and defines an aperture 139 therein. Correspondingly, computer platform 15 defines a curved slot 120 aligned with aperture 139. As described above in FIG. 1, a shaft 113 is coupled to key lock 102 and extended through slot 120 and aperture 139. As is better seen in FIG. 3, a tab carrier 105 is joined to the forward ends of lock arms 110 and 92 in a conventional attachment such as welding or the like. A tab 104 extends forwardly from tab carrier 105 and lock arm 110 in the manner seen in FIG. 3. A link 116 is coupled to the forward end of lock arm 110 by a pivot 115 and is further coupled to flange 106 above hinge 121 by a pivot 117. As described above in FIG. 1, a corresponding attachment is provided between the forward arm of lock arm 92 and flange 100 by a link 98. Lock bar 90 includes a flange 122 which maintains the position of a computer upon computer platform 15. As described above, lock arm 110 is pivoted downwardly about pivot 111 as tab 104 is pressed causing the combined structure of lock bar 90 and flange 106 to pivot downwardly about hinge 121. During this pivotal motion of arm 110, shaft 113 travels through curved slot 120. In this position a computer supported upon computer platform 15 may be removed by sliding it forwardly with lock bar 90 pivoted out of the way as shown in dashed-line representation in FIG. 1.

FIG. 3 sets forth a partially sectioned top view of computer platform 15 supported upon flange 76 of platform bracket 20. As described above, the tilt-angle of flange 76 and platform 15 is adjustable and maintainable at a desired tilt-angle by a platform tilt adjustment knob 70.

Platform 15 defines a generally planar upper surface and includes a pair of brackets of 80 and 83 on opposed sides thereof. A clamp 81 is secured to the upper surface of platform 15 and is operative to engage a cooperating lip upon computer 65 (seen in FIG. 1) to secure a computer upon platform 15. Platform 15 further includes a pair of lock arms 92 and 110 pivotally secured to platform 15 by pivots 93 and 111 respectively. A tab carrier 105 supports a pair of tabs 103 and 104 and is secured to the forward end of lock arms 92 and 110 by weld attachments 140 and 141. A lock bar 90 having flanges 91 and 122 at the corner portions thereof is pivotally secured to platform 15 by a pair of hinges 101 and 121. Lock bar 90 further includes a pair of flanges 100 and 118 extending rewardly from lock bar 90. A pair of links 98 and 116 are pivotally coupled between lock arms 92 and 110 respectively and flanges 100 and 118 respectively. As described above, the combination of lock arms 92 and 110, links 98 and 116, and flanges 100 and 118 cooperate to pivot lock bar 90 between its raised and lowered positions.

Platform 15 defines a pair of slots 96 and 120 on opposite sides thereof. As shown above in FIGS. 1 and 2, slots 96 and 120 are curved to facilitate pivotal movement of lock arms 92 and 110. Slots 96 and 120 each provide an upper portion which is greater in dimension than the downwardly extending curved portion of the slots. Thus with temporary reference to FIG. 2, it will be noted that curve slot 120 defines a larger diameter generally circular upper portion 143. While not seen in FIG. 3, it will be understood that slot 96 is identical to slot 120 and includes this enlarged portion feature. Returning to FIG. 3, a shaft 113 is rotatably supported upon lock arm 110 at one end and is coupled to a key lock 102 at the remaining end. Thus, shaft 113 passes through curved slots 120 and 96 formed in platform 15. Key lock 102 is in conventional fabrication and receives and supports a key 95. Key lock 102 is secured to lock arm 90 in the manner shown in FIG. 1 and cooperates with key 95 to form a lock mechanism 94.

Shaft 113 defines a reduced size flatted portion 145 within slot 96 and a reduced size flatted portion 114 within slot 120. The function of flatted portions 145 and 114 is operative to inhibit the movement of shaft 113 downwardly through slots 96 and 120 unless the shaft is rotated by key lock 102 and key 95 to the proper position of flatted portions 145 and 114. Thus, the rotational position of key lock 102 provided by key 95 alternatively positions shaft 113 for movement downwardly through slots 96 and 120 or, alternatively, prevents downward movement from the enlarged portion of the slots. As a result, a lock mechanism 94 is provided which allows the user to prevent pivotal motion of lock bar 90 and thereby prevent the removal of a computer from platform 15.

FIG. 4 sets forth a rear perspective view of the present invention computer support having computer platform 15 removed therefrom. Computer support 10 includes a base 12 having flanges 21 and 22 (flange 21 shown in FIG. 1). Base 12 is securable to a vehicle surface 11 which may for example comprise the transmission hump of a vehicle using conventional fasteners passing through apertures 49 formed in base 12. A riser bracket 13 is pivotally secured to base 12 by a pair of pivots 30 and 31 (pivot 30 seen in FIG. 1). A bolt 24 passes through riser bracket 13 and curved slots 23 and 25 (seen in FIGS. 1 and 2). Bolt 24 is tightened to secure the angular position of riser bracket 13 about pivots 30 and 31. Riser bracket 13 further supports a pair of elongated risers 30 and 40 each defining interior channel 32 and 42 respectively. A pair of moveable slides 31 and 41 are slidingly supported within channels 32 and 42 to provide a "telescoping" extension of slides 31 and 41 within risers 30 and 40. Slide 41 further includes a stop 38 preferably formed of a resilient material or the like at the upper end thereof. As is better seen in FIG. 1, slide 31 defines a corresponding resilient stop 38. Riser bracket 13 further defines an elongated lock guide 35 having a slot 37 formed therein. Lock guide 35 and slot 37 extend vertically upon the back side of riser bracket 13.

An arm carrier 14 is secured to slides 31 and 41 using conventional attachments such as fasteners or the like. Arm carrier 14 further supports a shaft 34 and a knob 33. Knob 33 defines an internally threaded end 39 which receives a correspondingly threaded end of shaft 34 (not shown). As is better seen in FIG. 5, shaft 34 includes a reduced diameter portion extending through slot 37 and supporting a head 36 within lock guide 35.

Returning to FIG. 4, the tightening of knob 33 secures the vertical position of arm carrier 14 at the desired height. A gas shock 59 includes a shock end 61 secured to riser bracket 13. Shock 59 extends upwardly into arm carrier 14 and by means not shown is secured to arm carrier 14. The function of shock 59 is to provide a smoother action for raising and lowering arm carrier 14.

Arm carrier 14 further supports a lock pin 132 while riser bracket 113 supports a latch arm 133 at a pivotally attachment 135. Arm 133 defines a notch 134 and an extending tab 131. Latch arm 133 and pin 132 cooperate to provide a latch mechanism 130. Latch mechanism 130 operates to secure arm carrier 14 at its most compact or lowered position in the manner seen in FIG. 2. The latch provided by latch mechanism 130 is released by simply pivoting tab 131 upwardly which in turn moves notch 134 away from pin 132 and releases arm carrier 14. Thereafter, arm carrier 14 may be moved after knob 33 has been loosened to a desired height and then secured at such height by tightening knob 33.

Arm carrier 14 further supports an arm 50 using a pivot bolt 52 at the upper portion of arm carrier 14. Arm 50 further supports a travel limit pin 64 and is pivotally secured to an arm 51 by a bolt 56. Bolt 56 includes a head 57 at the upper end thereof and a knob 55 beneath arms 50 and 51. Bolt 56 is threadably received within knob 55 such that knob 55 may be tightened to squeeze arm 50 against arm 51 to secure the pivotal adjustment between arms 50 and 51 at a desired angular position. Arm 51 further defines a pair of notches 63 and 86 which contact pin 64 as arm 51 is pivoted in the direction indicated by arrow 150 to provide a travel limit for the pivotal motion of arm 51.

Computer support 10 further includes a platform bracket 2o having an upper surface 123 which receives flange 76 and platform 15 (seen in FIG. 3). Platform bracket 20 further defines a curved slot 79 on one side thereof and a corresponding curved slot (not shown) on the opposite side thereof. Platform bracket 20 further defines a interior cavity 124 within which a platform bracket carrier 177 is pivotally secured by a pivot bolt 75. An elongated bolt 71 having a head 72 extends through slot 79 of platform bracket 20 and the oppositely positioned slot (not shown). Platform bracket carrier 77 defines an aperture 28 on one side thereof and a corresponding aperture (not shown) on the remaining side thereof to facilitate extension of bolt 71 through platform bracket carrier 77. Bolt 71 extends outwardly from platform bracket 20 and is threadably received within interior thread 74 of a platform tilt adjustment knob 70. A bushing 73 is received upon bolt 71 and is interposed between knob 70 and platform bracket 20. As a result, platform tilt adjusting knob 70 may be loosened to facilitate pivotal motion of platform bracket 20 about pivot bolt 75 to the desired tilt position after which tightening knob 70 draws head 72 against bracket 20 and secures the tilt adjustment.

Platform bracket 77 further includes a flange 78. The outer end of arm 51 is received beneath flange 78 of platform bracket carrier 77 and is pivotally secured thereto by a bolt 125. Bolt 125 includes a head 126 on the underside thereof and a faceting nut 127 on the upper end thereof. The tension upon bolt 125 may be adjusted to provide a desired angular relationship between platform bracket 20 and arm 51 or, alternatively, may be slightly loosened to facilitate pivotal motion as desired.

FIG. 5 sets forth a partial section view of the vertical position adjustment locking mechanism of computer support 10 taken along section lines 5—5 in FIG. 4. As described above, a shaft 34 extends through a slot 37 formed in a lock guide 35. With temporary reference to FIG. 4 it will be noted that lock guide 35 and slot 37 extend vertically between risers 30 and 40. Further it will recalled that shaft 34 is coupled to adjustment knob 33. Returning to FIG. 5, the extension of shaft 34 into slot 37 and the larger size of head 36 with respect to slot 37 facilitate the closure of head 36 against shaft 34 when knob 33 (seen in FIG. 4) is tightened. This mechanism provides for the maintenance of a desired vertical extension of the present invention computer support.

What has been shown is a computer support for vehicle use having multiple position adjustments which is securable within a vehicle such as a conventional automobile or the like and which is multiply positionable and multiply adjustable to provide effective support of a computer within the crowded interior of an emergency vehicle such as a police vehicle or the like. The device provided securely supports a computer at vertically any position or extension and vertically eliminates any looseness of support characteristic of other devices previously provided.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A computer support for use in supporting a computer within a vehicle, said computer support comprising:
   a base securable to a surface within a vehicle;
   a riser bracket pivotally secured to said base at a first pivotal attachment;
   a pair of extendible risers each secured to said riser bracket and each having an extendible slide for vertical position adjustment;
   an arm carrier secured to said slides;

a pair of elongated arms pivotally joined together at a common pivot to form a second pivotal attachment, one of said elongated arms being pivotally secured to said arm carrier at a third pivotal attachment;

a platform bracket carrier pivotally secured to the remaining one of said elongated arms at a fourth pivotal attachment;

a platform bracket pivotally secured to said platform bracket carrier at a fifth pivotal attachment;

a computer platform secured to said platform bracket and having means for engaging a computer; and lock means for releasibly captivating a computer upon said computer platform.

2. The computer support set forth in claim 1 wherein said first pivotal attachment includes a first pivot bolt which may be loosened to facilitate vertical angle adjustment of said risers and tightened to secure a selected angle.

3. The computer support set forth in claim 2 wherein said vertical position adjustment includes a height-adjustment bolt and means for tightening said bolt to secure a selected height extension of said risers.

4. The computer support set forth in claim 3 wherein said second pivotal attachment includes a second pivot bolt which may be loosened to facilitate adjustment of the angle between said arms and tightened to secure a selected angle.

5. The computer support set forth in claim 4 wherein said third pivotal attachment includes a third pivot bolt which may be loosened to facilitate adjustment of the angle between said arm carrier and said one of said elongated arms and tightened to secure a selected angle.

6. The computer support set forth in claim 5 wherein said fourth pivotal attachment includes a fourth pivot bolt which may be loosened to facilitate adjustment of the angle between said platform carrier bracket and said remaining one of said elongated arms and tightened to secure a selected angle.

7. The computer support set forth in claim 6 wherein said fifth pivotal attachment includes a fifth pivot bolt which may be loosened to facilitate adjustment of the tilt-angle between said platform bracket and said platform bracket carrier and tightened to secure a selected tilt-angle.

8. The computer support set forth in claim 3 wherein said height-adjustment bolt includes a height-adjustment knob secured thereto in a threaded engagement.

9. The computer support set forth in claim 4 wherein said second pivot bolt includes an arm-angle adjustment knob secured thereto in a threaded engagement.

10. The computer support set forth in claim 7 wherein said fifth pivot bolt includes a tilt-angle adjustment knob secured thereto in a threaded engagement.

11. The computer support set forth in claim 1 wherein said fifth pivotal attachment includes a fifth pivot bolt which may be loosened to facilitate adjustment of the tilt-angle between said platform bracket and said platform bracket carrier and tightened to secure a selected tilt-angle.

12. The computer support set forth in claim 11 wherein said fifth pivot bolt includes a tilt-angle adjustment knob secured thereto in a threaded engagement.

13. The computer support set forth in claim 1 wherein said second pivotal attachment includes a second pivot bolt which may be loosened to facilitate adjustment of the angle between said arms and tightened to secure a selected angle.

14. The computer support set forth in claim 13 wherein said second pivot bolt includes an arm-angle adjustment knob secured thereto in a threaded engagement.

15. The computer support set forth in claim 1 wherein said vertical position adjustment includes a height-adjustment bolt and means for tightening said bolt to secure a selected height extension of said risers.

16. The computer support set forth in claim 15 wherein said height-adjustment bolt includes a height-adjustment knob secured thereto in a threaded engagement.

17. The computer support set forth in claim 1 further including a releasible latch operative between said arm carrier and said riser bracket for latching said riser bracket in its lowest vertical height position.

* * * * *